US008375102B2

(12) United States Patent
Medard et al.

(10) Patent No.: US 8,375,102 B2
(45) Date of Patent: *Feb. 12, 2013

(54) RANDOM LINEAR CODING APPROACH TO DISTRIBUTED DATA STORAGE

(75) Inventors: Muriel Medard, Cambridge, MA (US); Supratim Deb, Cambridge, MA (US); Ralf Koetter, Champaign, IL (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/267,764

(22) Filed: Oct. 6, 2011

(65) Prior Publication Data

US 2012/0096124 A1 Apr. 19, 2012

Related U.S. Application Data

(63) Continuation of application No. 11/026,550, filed on Dec. 30, 2004, now Pat. No. 8,046,426.

(51) Int. Cl.
*G06F 15/16* (2006.01)
(52) U.S. Cl. ...................................................... 709/217
(58) Field of Classification Search .................... 709/217
See application file for complete search history.

(56) References Cited

U.S. PATENT DOCUMENTS

| | | | | |
|---|---|---|---|---|
| 5,924,060 | A * | 7/1999 | Brandenburg | 704/200 |
| 6,370,389 | B1 * | 4/2002 | Isomursu et al. | 455/466 |
| 8,046,426 | B2 * | 10/2011 | Medard et al. | 709/217 |
| 2002/0147645 | A1 * | 10/2002 | Alao et al. | 705/14 |
| 2004/0054807 | A1 * | 3/2004 | Harvey et al. | 709/243 |
| 2004/0215516 | A1 * | 10/2004 | Denoon et al. | 705/14 |
| 2004/0249972 | A1 * | 12/2004 | White et al. | 709/243 |
| 2005/0152391 | A1 * | 7/2005 | Effros et al. | 370/432 |
| 2005/0283537 | A1 * | 12/2005 | Li et al. | 709/240 |
| 2006/0075063 | A1 * | 4/2006 | Grosse et al. | 709/217 |
| 2006/0146791 | A1 * | 7/2006 | Deb et al. | 370/352 |

OTHER PUBLICATIONS

Deb, S. et al., Algebraic Gossip: A Network Coding Approach to Optimal Multiple Rumor Mongering. Submitted to IEEE Transactions on Information Theory, Apr. 2004. pp. 1-10.*
Acedanski, S. et al., How Good is Random Linear Coding Based Distributed Networked Storage?, 2005, Proceedings of the 2005 International Symposium on Network Coding, pp. 1-6.*
Deb S. et al., Data Harvesting: A Random Coding Approach to Rapid Dissemination and Efficient Storage of Data, 2005, Proceedings of the 2005 International Symposium on Network Coding, pp. 1-12.*

(Continued)

*Primary Examiner* — Alicia Baturay
(74) *Attorney, Agent, or Firm* — Anderson Gorecki & Rouille LLP

(57) ABSTRACT

A method and computer program product for providing a random linear coding approach to distributed data storage is presented. A file is broken into a plurality of pieces. For every peer (peer means storage-location with limited storage space), the number of coded-pieces the peer can store is determined. Each of the coded-piece is determined by taking random linear combination of all the pieces of the entire file. The associate code-vector is stored for every coded-piece. The file is retrieved by collecting code-vectors and the coded-pieces from the peers and viewing the collected code-vectors as a matrix. When a dimension of the matrix is equal to the number of pieces of the file, the file is recovered using the collection of code vectors in the matrix.

11 Claims, 8 Drawing Sheets

OTHER PUBLICATIONS

Ho, T. et al., The Benefits of Coding over Routing in a Randomized Setting, 2003, Proceedings of the 2003 IEEE International Symposium on Information Theory, pp. 442-447.*

Ho, T. et al., Network Coding from a Network Flow Perspective, 2003, Proceedings of the 2003 IEEE International Symposium on Information Theory, pp. 441-446.*

Ho, T. et al., On Randomized Network Coding, 2003, In Proceedings of 41st Annual Allerton Conference on Communication, Control, and Computing, pp. 1-10.*

Koetter R. et al., An Algebraic Approach to Network Coding, Oct. 2003, IEEE/ACM Transactions on Networking, vol. 11, Issue 5, pp. 782-795.*

Koetter R. et al., Beyond Routing: An Algebraic Approach to Network Coding, 2002, INFOCOM 2002, Twenty-First Annual Joint Conference of the IEEE Computer and Communications Societies, vol. 1, pp. 122-130.*

Li S-Y. et al., Linear Network Coding, Feb. 2003, IEEE Transactions on Information Theory, vol. 49, Issue 2, pp. 371-381.*

Qiu D. et al., Modeling and performance analysis of BitTorrent-like peer-to-peer networks, 2004, SIGCOMM '04 Proceedings of the 2004 conference on Applications, technologies, architectures, and protocols for computer communications, ACM, pp. 367-377.*

Shrader B. et al., On Packet Lengths and Overhead for Random Linear Coding Over the Erasure Channel, 2007, Proceeding IWCMC '07 Proceedings of the 2007 international conference on Wireless communications and mobile computing, ACM, pp. 314-318.*

* cited by examiner

RANDOM LINEAR CODING APPROACH TO DISTRIBUTED DATA STORAGE

CROSS-REFERENCE TO RELATED APPLICATIONS

This application is a Continuation Application of U.S. patent application Ser. No. 11/026,550, filed on Dec. 30, 2004, now U.S. Pat. No. 8,046,426 entitled "A RANDOM LINEAR CODING APPROACH TO DISTRIBUTED DATA STORAGE."

BACKGROUND

The most common method by which files are transferred on the Internet is the client-server model. A central server sends the entire file to each client that requests it. The clients only speak to the server, and not to each other. The main advantages of this method are that it's simple to set up, and the files are usually always available since the servers tend to be dedicated to the task of serving, and therefore are always on and connected to the Internet.

Another method of transferring files utilizes a peer-to-peer network. Systems such as Kazaa, eDonkey, Gnutella, Direct Connect, etc. are examples of peer-to-peer networks. In most of these networks, Internet users trade files by directly connecting one-to-one. The advantage of this method is that files can be shared without having access to a server, and because of this there is little accountability for the contents of the files. Hence, these networks tend to be very popular for illicit files such as music, movies, pirated software, etc. Typically, a downloader receives a file from a single source, however some clients allow downloading a single file from multiple sources for higher speeds.

BitTorrent is a protocol designed for transferring files. It is peer-to-peer in nature, as users connect to each other directly to send and receive portions of the file. However, there is a central server (called a tracker) which coordinates the action of all such peers. The tracker manages connections, but does not have any knowledge of the contents of the files being distributed, and therefore a large number of users can be supported with relatively limited tracker bandwidth. The key philosophy of BitTorrent is that users should upload (transmit outbound) at the same time they are downloading (receiving inbound.) In this manner, network bandwidth is utilized as efficiently as possible. BitTorrent is designed to work better as the number of people interested in a certain file increases, in contrast to other file transfer protocols.

SUMMARY

Conventional mechanisms such as those explained above suffer from a variety of deficiencies. The client-server model has a significant problem with files that are large or very popular, or both. Namely, it takes a great deal of bandwidth and server resources to distribute such a file, since the server must transmit the entire file to each client. The concept of mirrors partially addresses this shortcoming by distributing the load across multiple servers. A great deal of coordination and effort are required to set up an efficient network of mirrors, and it's usually only feasible for the busiest of sites.

In conventional peer-to-peer mechanizations, the problem of popular downloads is somewhat mitigated, because there's a greater chance that a popular file will be offered by a number of peers. The breadth of files available tends to be fairly good, though download speeds for obscure files tend to be low. Another common problem sometimes associated with these conventional peer-to-peer systems is the significant protocol overhead for passing search queries amongst the peers, and the number of peers that one can reach is often limited as a result. Partially downloaded files are usually not available to other peers, although some newer clients may offer this functionality. Availability is generally dependent on the goodwill of the users, to the extent that some of these networks have tried to enforce rules or restrictions regarding send/receive ratios.

A deficiency in conventional Bit-torrent type mechanisms is that there is a need to know what pieces of the file are stored where and how to manage the storing ands retrieval of the pieces. Typically, there is a central controller to distribute the pieces, with the controller maintaining a state of the contents of all the peers.

When a large file is broken into multiple pieces or chunks and each node in the network can only store a small number of the pieces it is difficult to determine an efficient way to store the pieces in a distributed manner. The problem is relevant in the context of many peer-to-peer systems like Bit-torrent, Split-stream, etc. In a technique referred to as Random Uncoded Storage each peer stores k different pieces out of the m pieces at random. Thus there are $\binom{m}{k}$ ways of storing data elements in a peer.

Embodiments of the invention significantly overcome such deficiencies and provide mechanisms and techniques that provide a random linear coding approach to distributed data storage. In a particular embodiment of a method for providing random linear coding for performing distributed data storage in a peer-to-peer network, a file is broken into a plurality of pieces. The number of peers to use to store pieces of the file is then determined. A random combination of particular pieces to store at a particular peer is also determined. A code vector is calculated for the random combination of particular pieces and a respective random combination of pieces and the associated code vector are stored at each peer of the number of peers. The file is retrieved by collecting code vectors from the peers and viewing the collected code vectors as a matrix. When a dimension of the matrix is equal to the number of pieces of the file, the file can be recovered using the collection of code vectors in the matrix.

Other embodiments include a computer readable medium having computer readable code thereon for providing distributed data storage in a peer-to-peer network. The medium includes instructions for breaking a file into a plurality of pieces. The medium also includes instructions for determining a number of peers to use to store pieces of the file and instructions for determining a random combination of particular pieces of the said plurality of pieces to store at a peer of the number of peers in the network. The medium additionally includes instructions for calculating an associated code vector for the random combination of particular pieces. The medium may further include instructions for storing a respective random combination of pieces and the associated code vector at each peer of the said number of peers.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides a random linear coding approach to distributed data storage as explained herein that when performed (e.g. when executing) on the processor, operates as explained herein within the computerized device to perform all of the method embodiments and operations explained herein as embodiments of the invention.

Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a random linear coding approach to distributed data storage as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A Random Linear Coding (RLC) based strategy for storing a large file in a distributed manner is presented. In an environment using RLC, there are many storage locations, each of which has a limited storage space. Each storage location chooses a part (or a coded version of the parts) of the file without the knowledge of what is stored in the other locations. By utilizing RLC based storage, the minimum number of storage locations a downloader needs to connect to (for reconstructing the entire file), can be very close to the case where there is complete coordination between the storage locations and the downloader. However, by using RLC there is no need for a controller or the associated cost and overhead of operating, updating and otherwise maintaining the controller.

In RLC, a large file is broken into multiple pieces or chunks and each node in the network can store a number of the pieces. There is no coordination among the storage nodes to decide what nodes store what pieces of the file. A linear coding based storage strategy improves the efficiency of distributed storage. Distributed storage of data has recently attracted a lot of attention in content distribution networks where participating nodes contribute their resources in efficient data distribution. In particular, the class of distributed systems popularly known as peer-to-peer networks rely on this idea.

Figure 1:
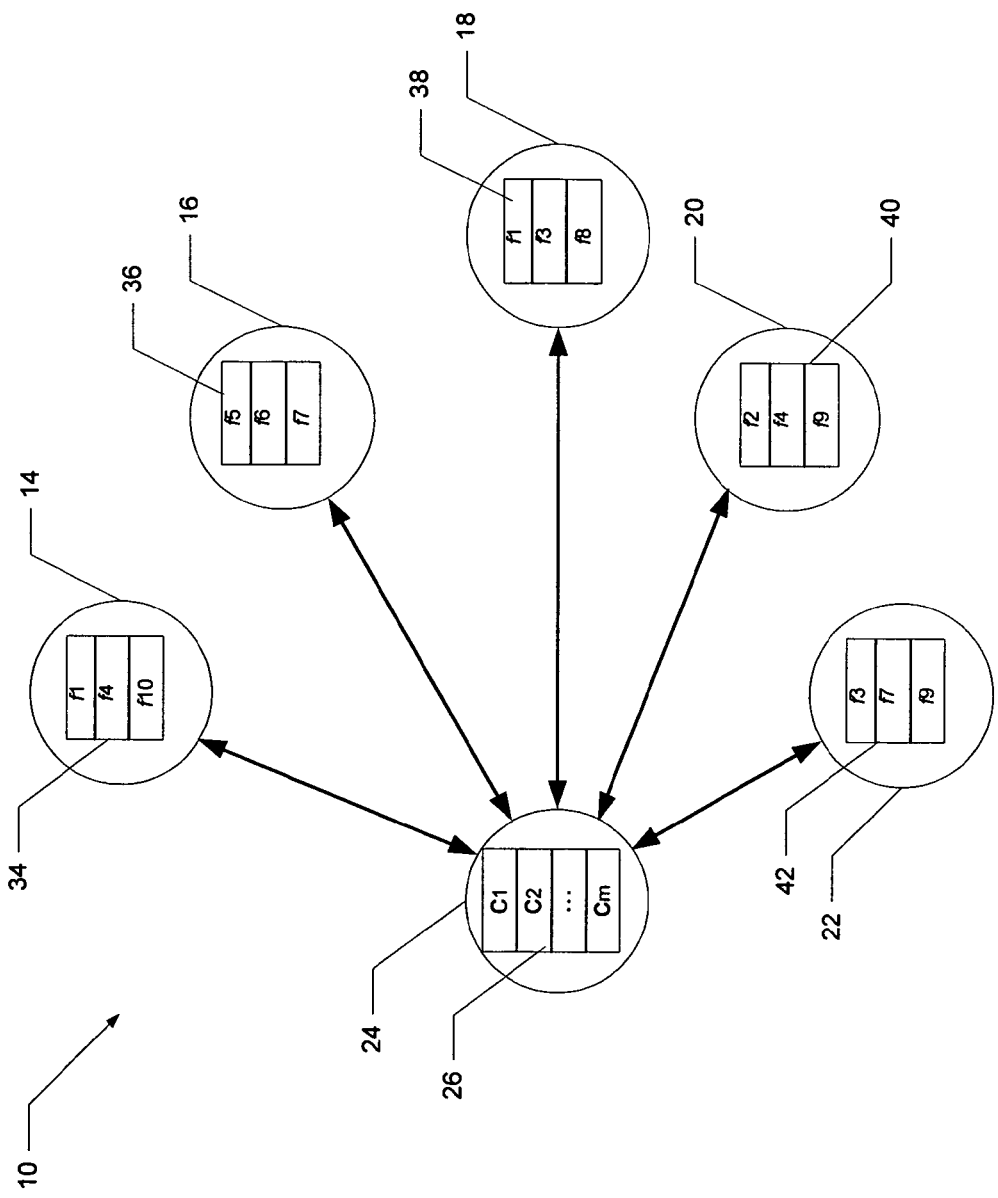
FIG. 1 depicts an environment using random linear coding for performing distributed data storage in a peer-to-peer network in accordance with embodiments of the invention.

Referring now to FIG. 1, an environment 10 utilizing a Random Linear Coding (RLC) based strategy for storing a large file in a distributed manner is shown. Using RLC, a large file 26 (or a set of files) is broken into m pieces, designated $c_1$, $c_2, \ldots c_m$. There are multiple nodes 14, 16, 18, 20 and 22 (also referred to as peers) or distributed memory elements each of which can store k of the m pieces. For example, peer 14 stores k coded-pieces (each coded piece is based on RLC) of file 26 as portion 34. Similarly, peer 16 stores k coded-pieces of file 26 as portion 36. Each peer stores a set of k coded-pieces. Each coded piece is decided using RLC based on $c_1, c_2, \ldots c_m$. For example, portion 34 is shown containing coded-pieces $f_1$, $f_4$ and $f_{10}$ while portion 36 contains pieces $f_5$, $f_6$ and $f_7$. A portion in one peer may include similar coded-pieces as a portion of another peer. For example, portion 40 of peer 20 includes coded-pieces $f_2$, $f_4$ and $f_9$ while portion 42 of peer 22 includes coded-pieces $f_3$, $f_7$, and $f_9$. Further, while each peer is shown having a respective portion, a peer may not be part of the distributed data storage and therefore would not include a portion. While only 5 peers are shown, and the file is shown broken into 10 pieces, it should be appreciated that any number of nodes can be used and that the file can be broken into any number of pieces.

No peer has any knowledge about what the other peers have stored. An implication of this is that, even if there is a central controller to distribute the pieces, the controller does not differentiate between the peers, and does not need to maintain a state of the contents of all the peers. Thus, the peers do not coordinate for storing pieces of the file. A coding based storage makes redundant any need for coordination between the peers for storing different pieces. A downloader completes its download once it gathers each of the m elements or has enough information to recover the m pieces that constitute the entire file. The downloader can connect to a fixed number of peers at a time.

There are generally two performance measures of interest in such a system. The downloader can connect to r of the peers after spending some time in the system (this can be over single or multiple connection instants depending on the value of r and the maximum number of peers the downloader can connect to). The first measure is, for any given fraction x, the probability that r peers can provide sufficient information for the downloader to complete at least x fraction of the download. This is a function of m, k, and r. A second performance measure is the mean fraction of overall download that can be availed from r different peers for different values of r.

In the Random Linear Coding based storage scheme, the m pieces of the file are viewed as elements in $F_q^s$ i.e., vectors of size s in a field of size q. Thus, the chunks are denoted as $c_i$, i=1, 2, . . . m, and each peer stores k random combinations of $c_i$'s. More specifically, if the elements with a particular peer are $f_1, f_2, \ldots f_k$, then a typical element $f_i$ can be represented as $$f_i = \sum_{j=1}^{m} \beta_j c_j, Pr(\beta_i = \beta) = \frac{1}{q} \forall \beta \in F_q$$

In this model the random mixing is a one time process. Further each peer also stores the associated vector $(\beta_1, \beta_2, \ldots, \beta_m)$ for each of the k pieces. This is referred to as the associated code vector. This will take an additional storage space of km $\log_2$ (q) bits. This is typically a small number compared to each piece of the broken file. For example, Bit-torrent breaks up a file into pieces having a size of 256 KB. Given a file of size 25 MB and wherein q=16, the file can thus be broken up into around 100 pieces, each of size 256 KB. Each randomly mixed piece in this scheme will require an overhead to store the code vectors of $m\log_2(q)$=400 bits or 50 bytes/piece. Thus the additional storage space required in percentage is 100×50 bytes/256 KB≅0.02%. For reconstructing the entire file, it is sufficient that the dimension of the code-vectors with the downloader is m.

For the Random Uncoded Storage mechanism, the number of peers r is fixed. S is a given set of pieces. The set of all the pieces is denoted by M.

$$g(S; |S| = j) \triangleq Pr(\text{no element of the set } S$$
$$\text{features in the } r \text{ peers} \mid |S| = j)$$
$$= (Pr(\text{a particular peer has}$$
$$\text{pieces only from } M \setminus S))^r$$
$$= \left[\frac{\binom{m-j}{k}}{\binom{m}{k}}\right]^r.$$

Note that, g(S)=0 for |S|>m−k since there are at least k distinct pieces with the peers. Y is the random variable denoting the exact number of pieces of the file missing in the r peers. Using an inclusion-exclusion argument, it follows that $$Pr(Y = y) = \sum_{j=y}^{m-k} (-1)^{j-y} \binom{j}{y} \sum_{S:|S|=j} g(S)$$
$$= \sum_{j=y}^{m-k} (-1)^{j-y} \binom{j}{y} \binom{m}{j} \left(\frac{\binom{m-j}{k}}{\binom{m}{k}}\right)^r$$

The preceding completely characterizes the distribution of Y Denoting by X the random variable the fraction of overall file available from the r peers, all relevant statistics about X can be calculated as follows.

$$Pr(X \geq x) = Pr(Y \leq m(1-x))$$

and further $$\mathbb{E}[X] = 1 - \frac{\mathbb{E}[Y]}{m}$$

For the Random Linear Coding based storage scheme with r peers, there are a total of kr m-dimensional code-vectors available for the downloader. Each of the code-vector represents a random mixture of the pieces. The collection of these vectors can be viewed as a kr×m matrix over $F_q$. The complete file can be recovered once the dimension of this matrix is m. As the downloader gathers information from more and more peers, it gathers more and more independent code-vectors.

D is the random variable denoting the dimension of the subspace spanned by all the kr code-vectors with the r peers. Z=D/m represents the fraction of total information required for the complete download. The distribution of Z based on certain results from random matrix theory over finite field can be determined. Lower bounds can be provided on the quantities of interest in terms of suitable binomial random variables. The following standard notations can be used for the probabilities of a binomial random variable.

$$b(l; n, p) \triangleq \binom{n}{l} p^l (1-p)^{n-l}$$

The code vectors are indexed with the r peers as $\gamma_1, \gamma_2 \ldots \gamma_{kr}$. $d_i$ is the following random variable.

$$d_i = \min(m, dim(\text{subspace spanned by } \gamma_1, \gamma_2 \ldots \gamma_i)).$$

Now, an application of Lemma 2.1 shows that $$Pr(d_{i+1} = d_i + 1 \mid d_i < m) \geq 1 - \frac{1}{q}.$$

Thus, if $B_i$'s are iid Bernoulli random variables with $Pr(B_i=1)=1-Pr(B_i=0)=1-1/q$, then $$Pr(d_{i+1}-d_i \geq b) \geq Pr(B_{i+1} \geq b), b \in \{0,1\}.$$

Thus the random variable $d_{i+1}-d_i$ stochastically dominates the random variable $B_{i+1}$. It immediately follows that $\Sigma_i(d_{i+1}-d_i)$ stochastically dominates $\Sigma_i B_i$. This is used to find a lower bound on the tail probability of D as follows. Since D=dkr $$Pr(Z \geq x) = Pr(d_{kr} \geq mx)$$

$$= Pr\left(\sum_{i=1}^{kr} (d_i - d_{i-1}) \geq mx\right) \geq Pr\left(\sum_{i=1}^{kr} B_i \geq mx\right)$$

$$= \sum_{j=\lceil mx \rceil}^{m} b\left(j; kr, 1 - \frac{1}{q}\right).$$

The second last step shows that the random variable D is stochastically dominated by the random variable min(m, $\Sigma_{i=1}^{kr} B_i$) where $B_i$'s are iid Bernoulli random variables with mean $1-1/q$. This fact is used to provide a simple lower bound on E[Z] as follows.

$$\mathbb{E}[Z] = \frac{\mathbb{E}[D]}{m} \geq \frac{1}{m} \mathbb{E}\left[\min\left(m, \sum_{i=1}^{kr} B_i\right)\right]$$

$$= 1 - \sum_{y=0}^{m-1} \left(1 - \frac{y}{m}\right) b\left(j; kr, 1 - \frac{1}{q}\right)$$

The last step follows from additional algebraic manipulations.

Figure 2A:
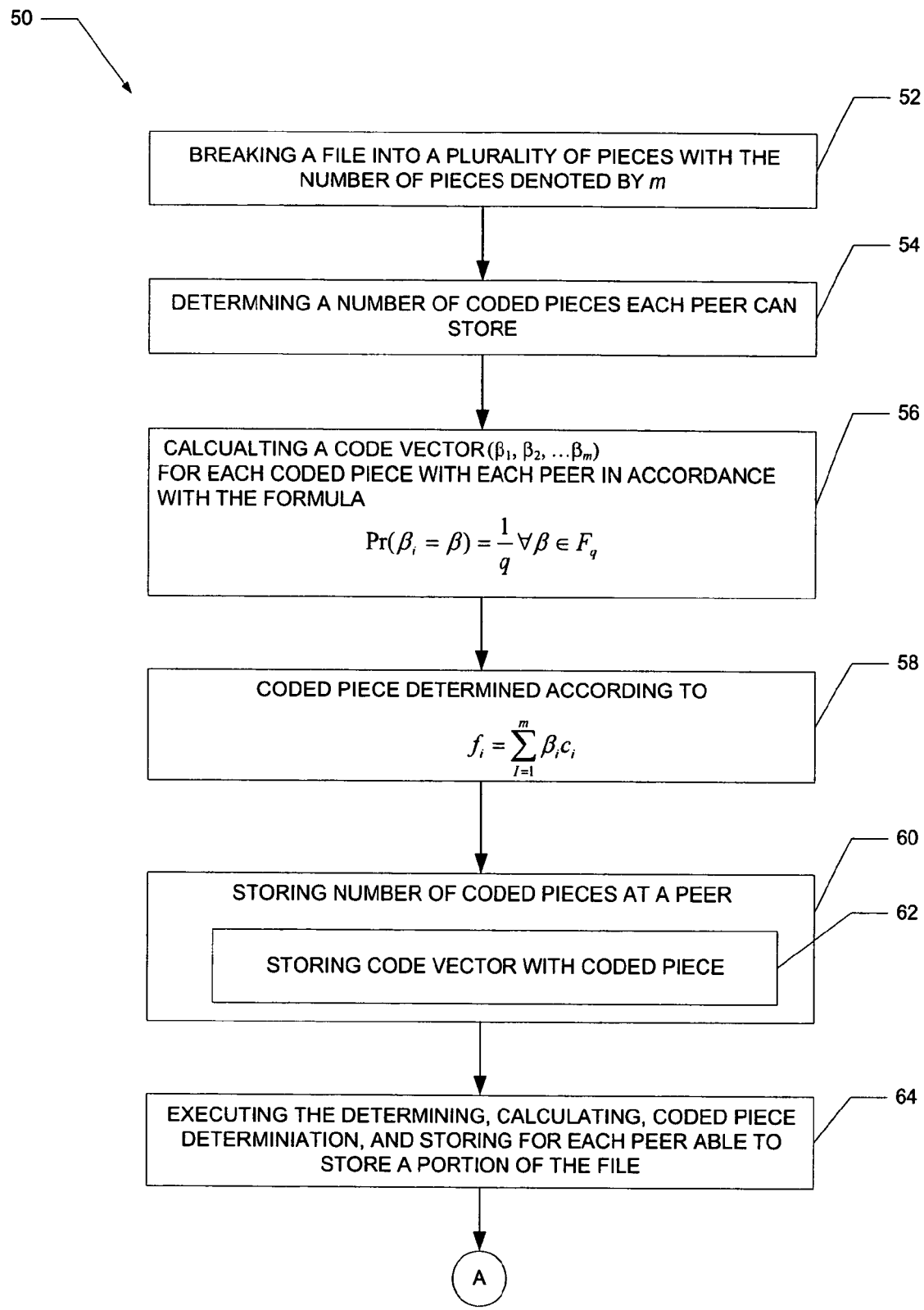
FIGS. 2A and 2B are a flow diagram of a particular embodiment using Random Linear coding for performing distributed data storage in a peer-to-peer network.
Figure 2B:
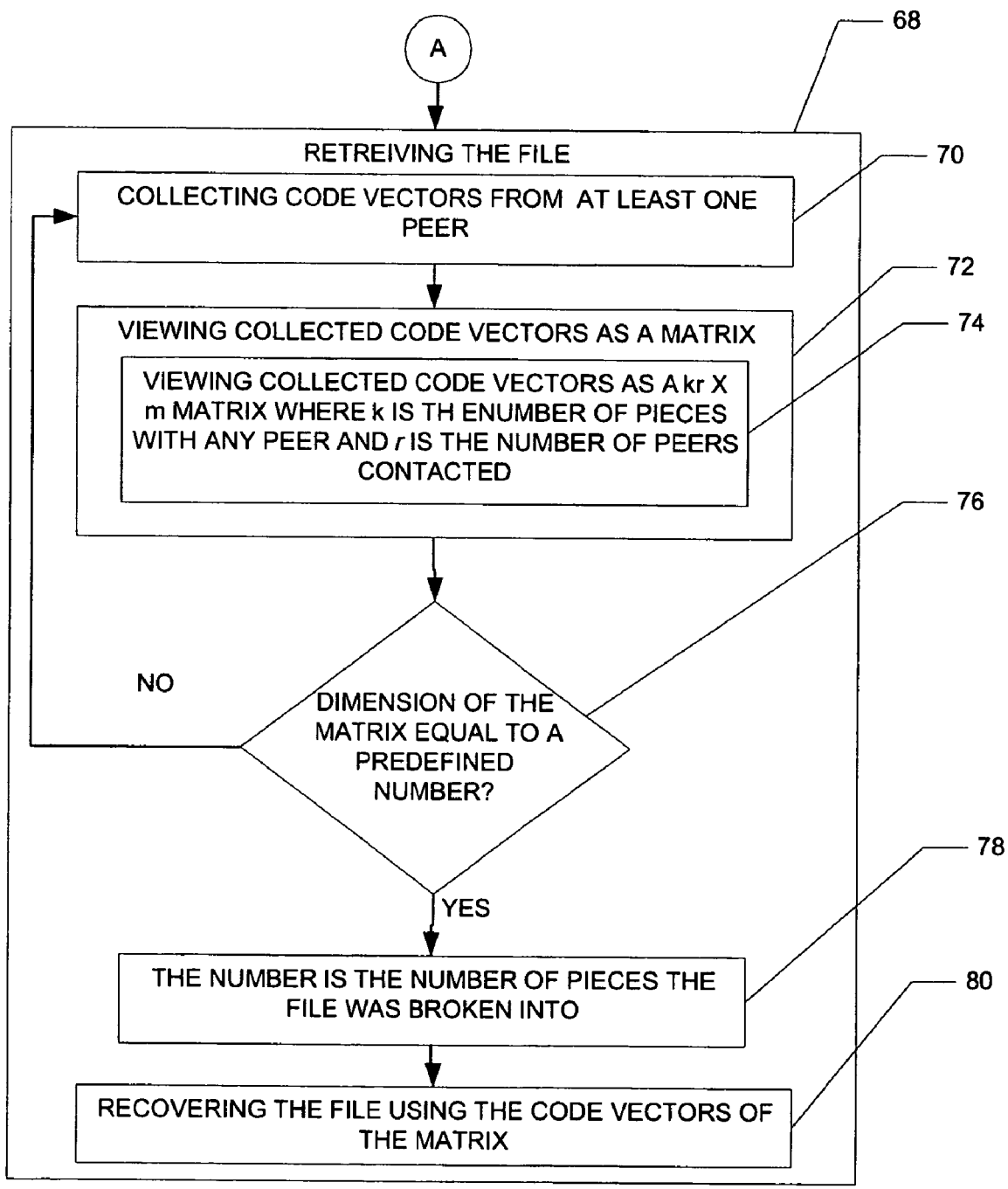
Figure 3:
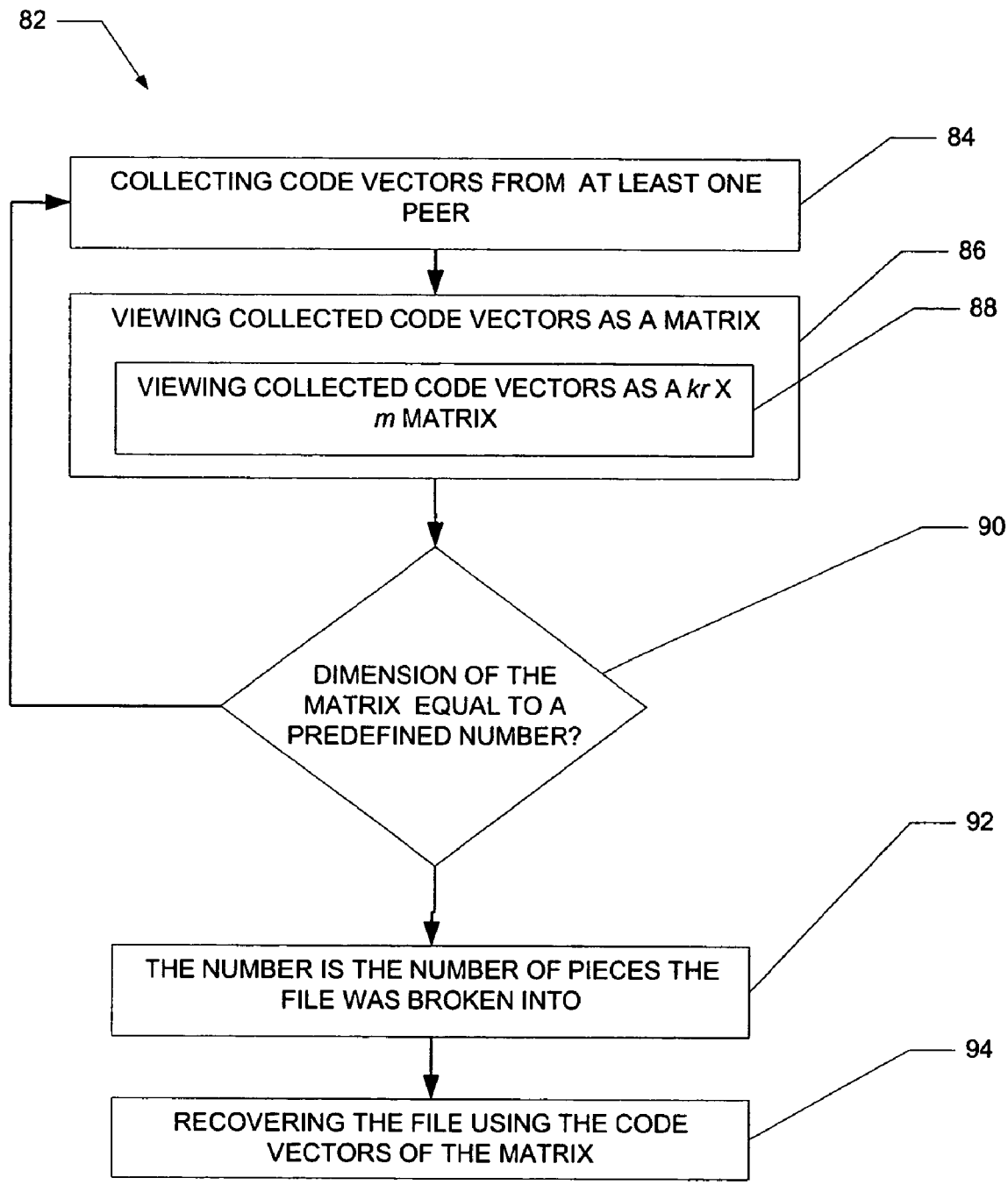
FIG. 3 is a flow diagram of a particular embodiment for retrieving a file previously stored by way of the distributed data storage method shown in FIGS. 2A and 2B.

A flow chart of the presently disclosed method is depicted in FIGS. 2A-2B and FIG. 3. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 2A and 2B, a method 50 of using Random Linear Coding for performing distributed data storage in a peer-to-peer network is shown. The method 50 starts at processing block 52 wherein a file is broken into a plurality of pieces which is denoted by m. Preferably, the pieces should all be the same size however different sized pieces could be used.

In processing block 54, for each peer in the network, the number of coded-pieces each peer can store is determined by dividing the "storage space with the peer" by "size of each piece".

In processing block 56, the code-vector for every coded-piece with every peer is determined using the formula $$Pr(\beta_i = \beta) = \frac{1}{q} \forall \beta \in F_q$$

for i=1 through i=m. The number of such code-vectors stored at a peer is determined by block 54.

In processing block 58 each coded-piece is determined according to the equation $$f_i = \sum_{j=1}^{m} \beta_i c_i,$$

where the $\beta_i$'s are determined according to block 56.

In processing block 60, the coded-pieces are stored at every peer. The number of such coded-piece at a peer is determined by block 54, and the coded-pieces are determined by block 58. In processing block 62, along with every coded-piece, the associated code-vector is also stored. The code-vector is determined by block 56.

Processing blocks 56-62 are executed repeatedly for all the peers that are willing to store some portion of the file.

Referring now to FIG. 2B, the method may further include retrieving the file. As shown in processing block 68, the file is retrieved. The retrieving of the file includes, as shown in processing block 70, collecting code vectors from at least one peer. In processing block 72, the collected code vectors are viewed as a matrix. As shown in processing block 74 the matrix may be realized as a kr×m matrix of $F_q$ wherein k is the number of pieces stored at a peer, r is the number of peers and $F_q$ is a matrix having vectors of size s in a field of size q.

In decision block 76, a determination is made regarding when a dimension of the matrix is equal to a predefined number. When the dimension of the matrix is not equal to the predetermined number, processing blocks 70 et seq. are executed again. As shown in processing block 78, in a particular embodiment the predefined number is the number of pieces the file is broken into. When the dimension of the matrix is not equal to the predetermined number, processing blocks 70 et seq. are executed again. When the dimension of the matrix is equal to the predefined number, processing continues at processing block 80.

In processing block 80, the file is recovered using the collection of code vectors in the matrix.

Referring now to FIG. 3, a method 82 of retrieving a file which has been previously stored in a distributed manner such as by the method described in FIG. 2A is shown. The method starts at processing block 84 wherein code vectors are collected from at least one peer.

In processing block 86, the collected code vectors are viewed as a matrix (for example, as shown in processing block 88 the matrix may be realized as a kr×m matrix of $F_q$ wherein k is the number of pieces stored at a peer, r is the number of peers and $F_q$ is a matrix having vectors of size s in a field of size q).

In decision block 90, a determination is made regarding when a dimension of the matrix is equal to a predefined number. When the dimension of the matrix is not equal to the predetermined number, processing blocks 84 et seq. are executed again. As shown in processing block 92, in a particular embodiment the predefined number is the number of pieces the file is broken into. When the dimension of the matrix is equal to the predefined number, processing continues at processing block 92. As shown in processing block 92, in a particular embodiment the predefined number is the number of pieces the file is broken into.

In processing block 94, the file is recovered using the collection of code vectors in the matrix.

Numerical results based on these lower bounds for a coding based scheme are compared with the probabilities obtained with the uncoded storage mechanism. X and Z denote the fraction of total required download with the random uncoded storage and random coding based storage respectively.

Figure 4A:
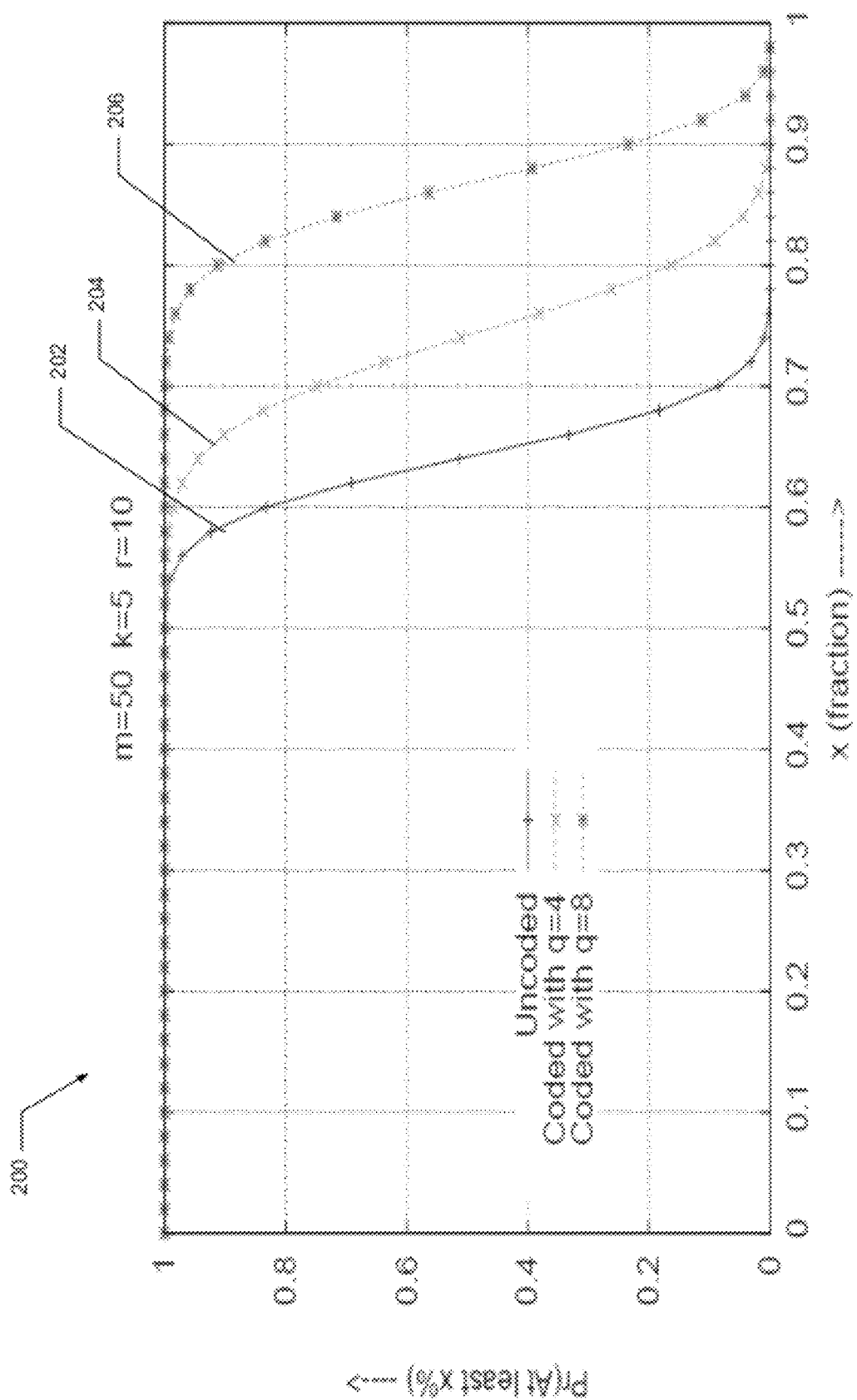
FIG. 4A is a plot showing the probability of a download completing with 10 peers for the two versions of the coded approach to distributed data storage and an uncoded approach to data storage.
Figure 4B:
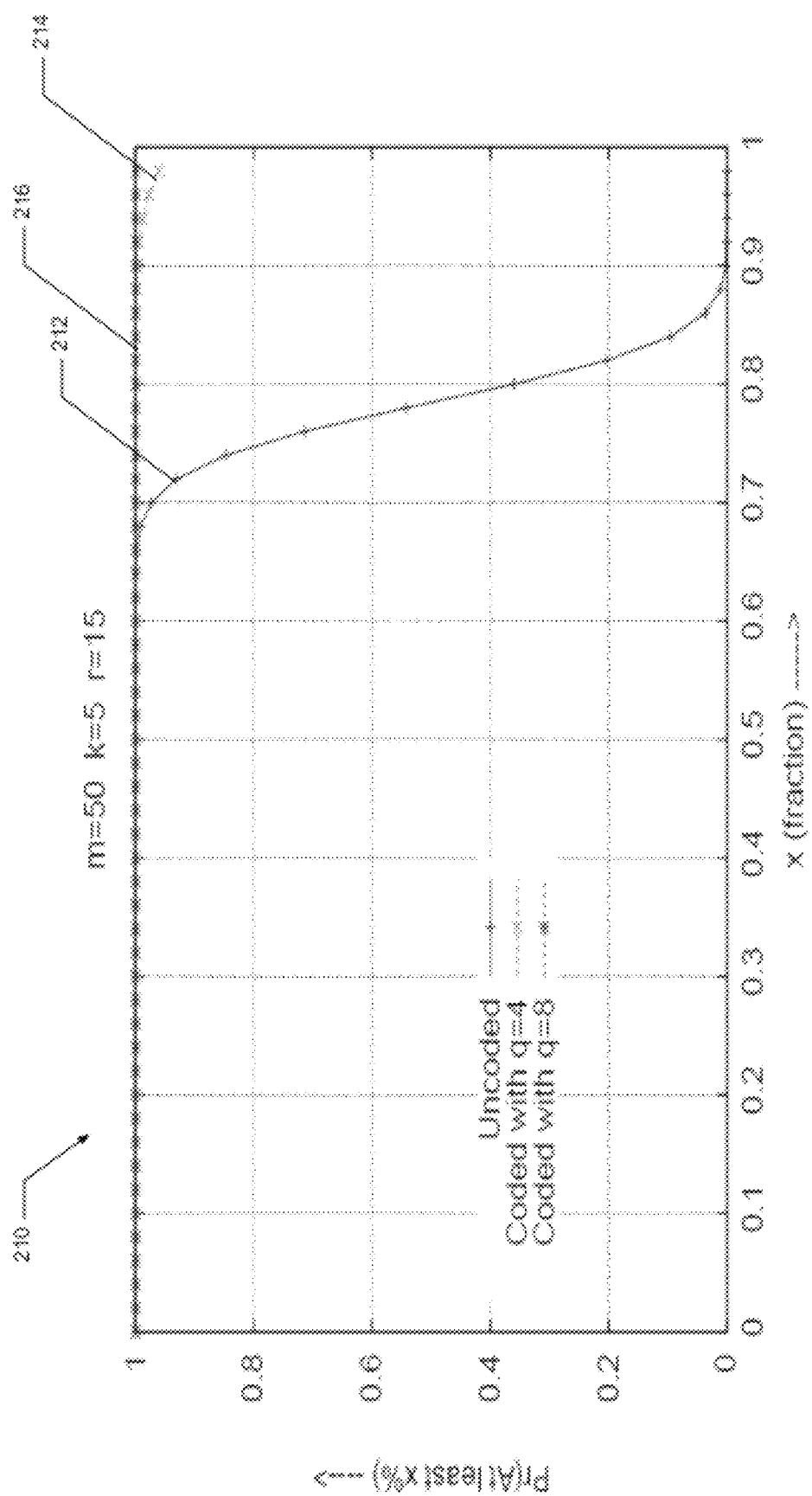
FIG. 4B is a plot showing the probability of a download completing with 15 peers for the two versions of the coded approach to distributed data storage and an uncoded approach to data storage.
Figure 4C:
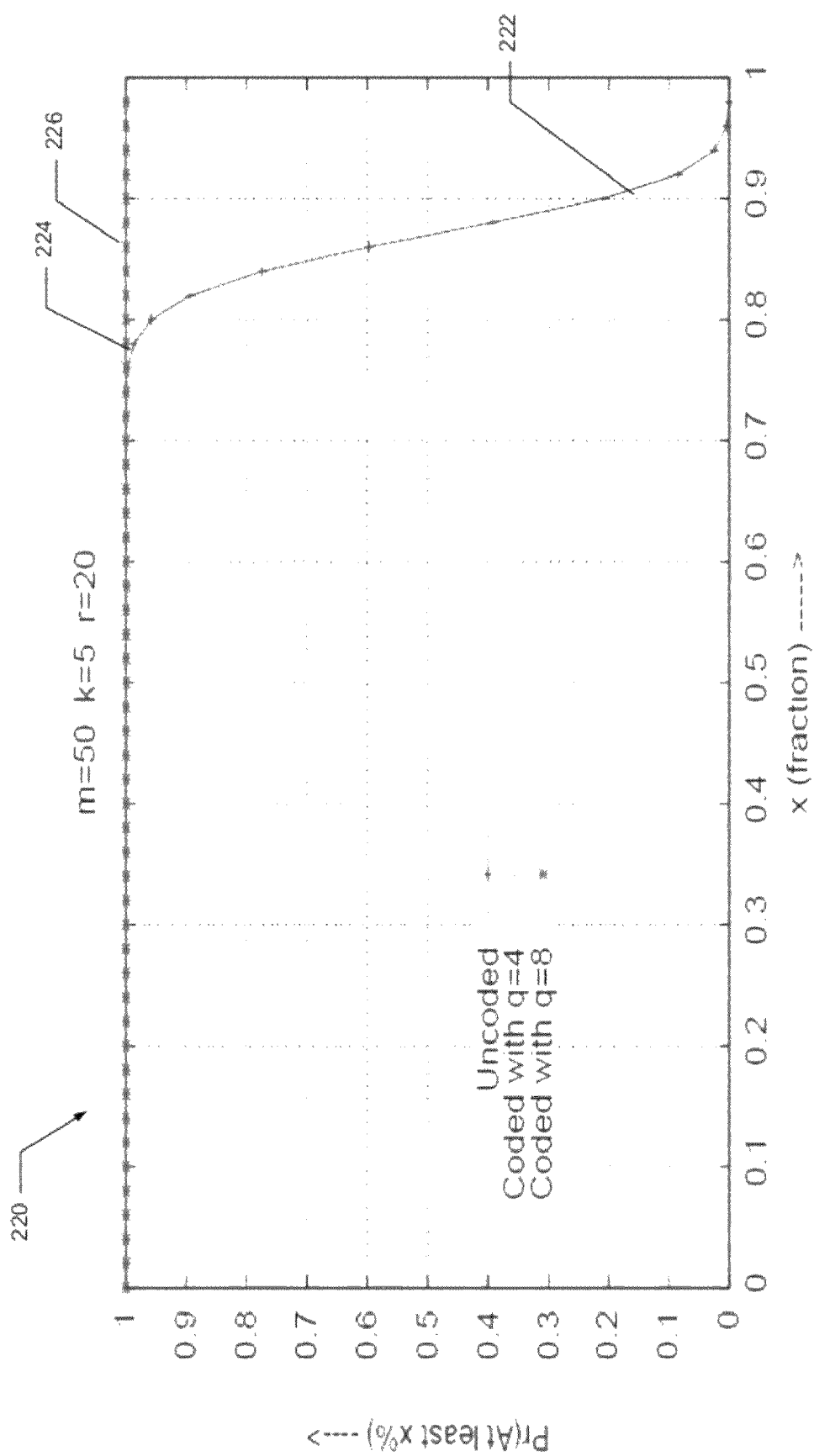
FIG. 4C is a plot showing the probability of a download completing with 20 peers for the two versions of the coded approach to distributed data storage and an uncoded approach to data storage.

Referring now to FIGS. 4A-4C, $Pr(X \geq x)$ is compared with the lower bound on $Pr(Z \geq x)$. The plots for three different values of r, namely r=10, 15, 20 are shown. A common feature in all the plots is that the curves fall very sharply. The plots demonstrate the advantage of a coding based storage. For example, referring to FIG. 4A a graph 200 shows that a file broken into 50 pieces (m=50), with 5 pieces stored at each node (k=5) with 0 nodes (r=10) it is only with a probability of less than 0.05 that 75% of the download is completed (curve 202—uncoded), whereas with a coding based scheme and q=8, 75% of the download is complete with probability almost close to one (curve 206). A download using a coding based scheme having q=4 is shown in curve 204 which falls between curve 202 and curve 206.

Referring now to FIG. 4B, with a coding based scheme and q=8, then r=15 peers is almost certainly sufficient to complete the entire download as shown by curve 216. A coding based scheme wherein q=4, represented by curve 214, is almost as good as curve 216. The uncoded scheme, shown by curve 212, is not nearly as efficient.

Referring now to FIG. 4C, with r=20, both the coded scheme with q=4 and the coded scheme with q=8 represented by curves 224 and 226 respectively load the entire file. An uncoded storage scheme completes 80% of the download almost certainly for r=20, as shown by curve 222. It is the last few pieces of download that requires a lot more additional peers. Since r=10 peers is the minimum number required in any case, the additional peers required with a coding based storage to complete the download is indeed very small. In other words, the system behaves as if the peers had complete coordination and stored as many distinct pieces as possible.

Figure 5:
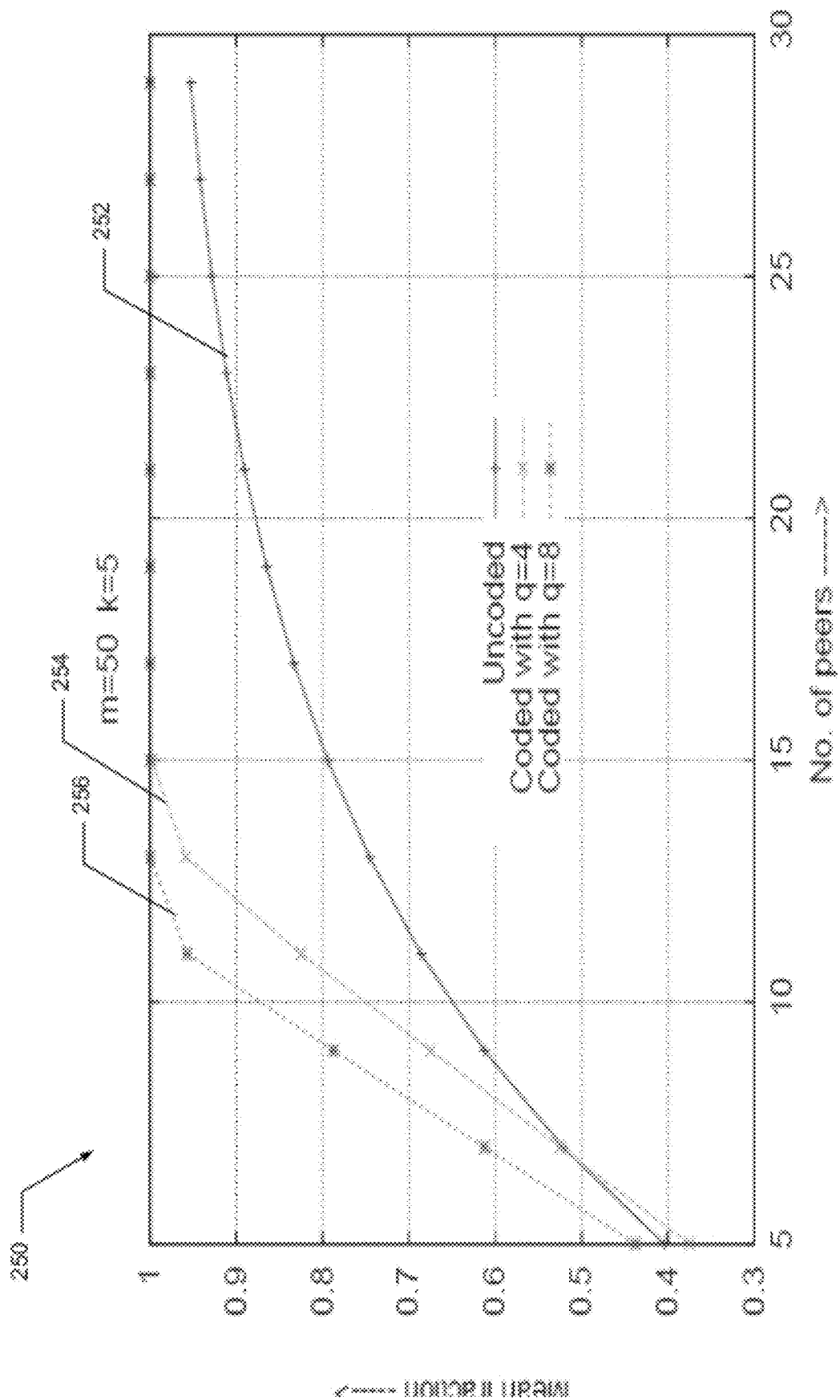
FIG. 5 is a plot showing the mean fraction of download for different numbers of peers for the two versions of the coded approach to distributed data storage and an uncoded approach to data storage.

Referring now to FIG. 5, the mean fraction of download is shown for different values of r, the number of peers. This shows the large number of peers required even for the mean fraction to get close to one with an uncoded storage. For a coding based storage, the mean downloaded fraction is very close to one (based on the lower bound), for r=0.15 and with q=4 as shown by curve 254 and slightly less for q=8 as shown by curve 256. As shown by curve 252, the uncoded mechanism completes a mean downloaded fraction of around 95% with r=30 peers.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of using random linear coding for performing distributed data storage in a peer-to-peer network, the method comprising:

receiving, at a peer, a request for at least one code-vector associated with coded pieces of a file, the at least one code-vector and the coded pieces of the file currently stored at the peer, wherein the coded pieces of the file comprise a subset of the file, wherein the coded pieces of the file were randomly determined for storage at the peer as a result of taking a random linear combination of all the pieces of the file in accordance with the formula:

$$f_i = \sum_{j=1}^{m} \beta_i c_i,$$

wherein f is an element within the peer, m is the number of pieces the file is broken into, β is an element of a finite field of vectors, and c is a particular piece of the file;

transmitting the at least one code-vector to a source of the request for the at least one code-vector; and upon receiving a request for the coded pieces of the file, transmitting the coded pieces of the file to the source of the request for the coded pieces of the file.

2. The method of claim 1, wherein the code-vector is calculated in accordance with the formula:

$$Pr(\beta_i = \beta) = \frac{1}{q} \forall \beta \in F_q$$

wherein F is the field of vectors, and q is the field size.

3. The method of claim 1, wherein receiving the request for the coded pieces of the file comprises:

receiving the request sent due to the source of the request collectively viewing the transmitted code-vector and at least one code-vector received from at least one respective additional peer as a matrix having a dimension that is equal to a predefined number.

4. The method of claim 3, wherein collectively viewing the transmitted code-vector and the at least one code-vector received from the at least one respective additional peer as the matrix comprises viewing a kr x m matrix of $F_q$ wherein k is the number of pieces stored at the peer, r is the number of peers, and $F_q$ is a matrix having vectors of size s in a field of size q.

5. The method of claim 3, wherein collectively viewing the transmitted code-vector and the at least one code-vector received from the at least one respective additional peer comprises viewing the transmitted code-vector and the at least one code-vector received from the at least one respective additional peer as a matrix having a dimension that is equal to a number of pieces the file is broken into.

6. A non-transitory computer readable medium having computer readable code thereon for providing a random linear coding approach to distributed data storage, the medium comprising:

instructions for receiving, at a peer, a request for at least one code-vector associated with coded pieces of a file, the at least one code-vector and the coded pieces of the file currently stored at the peer, wherein the coded pieces of the file comprise a subset of the file, wherein the coded pieces of the file were randomly determined for storage at the peer by taking a random linear combination of all the pieces of the file in accordance with the formula:

$$f_i = \sum_{j=1}^{m} \beta_i c_i,$$

wherein f is an element within the peer, m is the number of pieces the file is broken into, β is an element of a finite field of vectors, and c is a particular piece of the file;

instructions for transmitting the at least one code-vector to a source of the request for the at least one code-vector;

instructions for receiving a request for the coded pieces of the file; and instructions for transmitting the coded pieces of the file to the source of the request for the coded pieces of the file.

7. The non-transitory computer readable medium of claim 6, wherein the code-vector is calculated in accordance with the formula:

$$Pr(\beta_i = \beta) = \frac{1}{q} \forall \beta \in F_q$$

wherein F is the field of vectors, and q is the field size.

8. The non-transitory computer readable medium of claim 6, wherein the instructions for receiving the request for the coded pieces of the file comprise:

instructions for receiving the request sent due to the source of the request collectively viewing the transmitted code-vector and at least one code-vector received from at least one respective additional peer as a matrix having a dimension that is equal to a predefined number.

9. The non-transitory computer readable medium of claim 8, wherein the instructions for collectively viewing the transmitted code-vector and the at least one code-vector received from the at least one respective additional peer as the matrix comprises instructions for viewing a kr x m matrix of $F_q$ wherein k is the number of pieces stored at the peer, r is the number of peers, and $F_q$ is a matrix having vectors of size s in a field of size q.

10. The non-transitory computer readable medium of claim 8, wherein the instructions for collectively viewing the transmitted code-vector and the at least one code-vector received from the at least one respective additional peer as a matrix comprise viewing the transmitted code-vector and the at least one code-vector received from the at least one respective additional peer as a matrix having a dimension that is equal to a number of pieces the file is broken into.

11. A non-transitory computer readable device having computer readable code thereon for retrieving a file previously stored using a random linear coding approach to distributed data storage, the device comprising:

instructions for receiving, at a peer, a request for at least one code-vector associated with coded pieces of a file, the at least one code-vector and the coded pieces of the file currently stored at the peer, wherein the coded pieces of the file comprises a subset of the file, wherein the coded pieces of the file were randomly determined for storage at the peer by taking a random linear combination of all the pieces of the file in accordance with the formula:

$$f_i = \sum_{j=1}^{m} \beta_i c_i,$$

wherein f is an element within the peer, m is the number of pieces the file is broken into, β is an element of a finite field of vectors, and c is a particular piece of the file;

instructions for transmitting the at least one code-vector to a source of the request for the at least one code-vector;

instructions for receiving a request for the coded pieces of the file; and instructions for transmitting the coded pieces of the file to the source of the request for the coded pieces of the file;

wherein the instructions for receiving the request for the coded pieces of the file comprises:

instructions for receiving the request sent due to the source of the request collectively viewing the transmitted code-vector and at least one code-vector received from at least one respective additional peer as a matrix having a dimension that is equal to a number of pieces the file is broken into, wherein the instructions for collectively viewing the transmitted code-vector and the at least one code-vector received from the at least one respective additional peer as the matrix comprises instructions for viewing a kr×m matrix of $F_q$ wherein k is the number of pieces stored at the peer, r is the number of peers, and $F_q$ is a matrix having vectors of size s in a field of size q.

\* \* \* \* \*